March 29, 1949.   W. M. VENNER ET AL   2,465,767
PISTON
Filed Nov. 21, 1947

INVENTORS:
WILLIAM M. VENNER
PERCY L. BOWSER
BY Brumbaugh & Sutherland
ATTORNEYS.

Patented Mar. 29, 1949

2,465,767

UNITED STATES PATENT OFFICE 2,465,767

PISTON

William M. Venner, Clayton, and Percy L. Bowser, Jr., University City, Mo.

Application November 21, 1947, Serial No. 787,276

11 Claims. (Cl. 309—13)

This invention pertains to light-metal trunk pistons, adapted for use in internal-combustion engines.

One of the objects of this invention is to provide a light-metal piston which is flexible, so as to be able to accommodate itself to distortions of the engine cylinder but which, at the same time, will maintain an accurate fit in the cylinder at its thrust-faces.

Another object is to provide such a piston with means adapted to control its thermal expansion at critical points.

Another object is to provide such control means which will promote flexure under thermal expansion in a novel manner.

Further objects will appear from the following description, in connection with the accompanying drawing, in which an illustrative embodiment of this invention is set forth. It is to be understood, however, that this invention is susceptible of various embodiments, within the scope of the appended claims, without departing from the principles or spirit of the invention.

Figure 1:
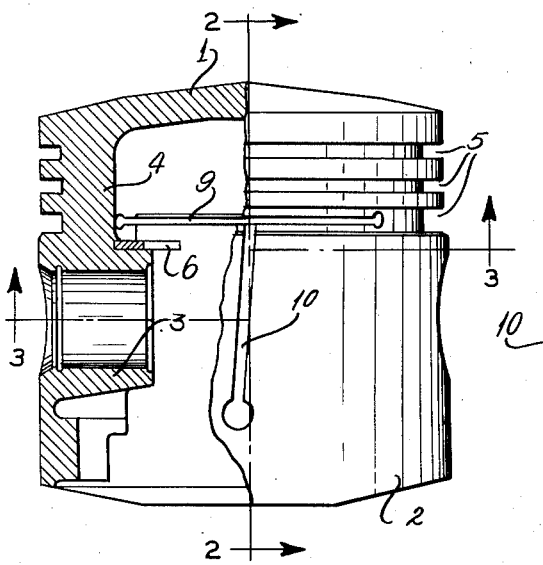
Figure 1 is a side view, partly in section, of a piston embodying this invention.
Figure 2:
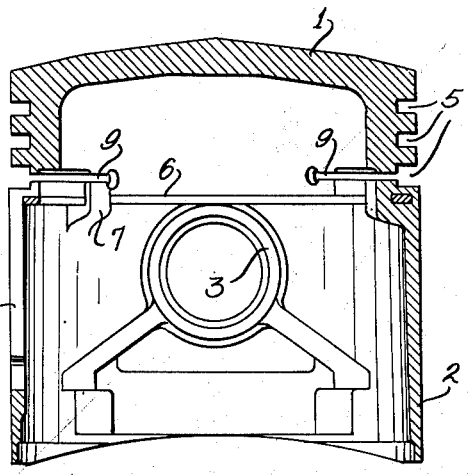
Figure 2 is a central, longitudinal section in a plane perpendicular to the wrist pin axis.
Figure 3:
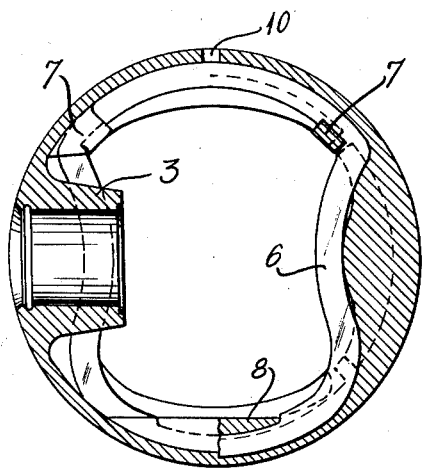
Figure 3 is a transverse section taken on line 3—3 of Figure 1.
Figure 4:
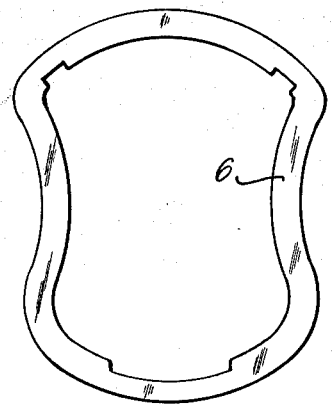
Figure 4 is a face view of the control element.

Referring now to the drawing, the piston comprises a head 1, a skirt indicated generally at 2, and wrist-pin bosses 3 connected to the head 1 by thickened thrust portions 4. The head portion of the piston may be provided with the usual piston-ring grooves 5. This portion is also smaller in diameter than the skirt portion, usually by about 0.020 inch. The skirt portion, below the bottom ring groove, is ground to oval form, being about 0.004 inch less in diameter along the wrist-pin axis than along the thrust axis. In some cases this skirt portion may also be "flared," i. e. slightly greater in diameter at the bottom, or open end, than at the head end.

The portions of the skirt located circumferentially between the pin bosses are the thrust faces, as these portions must take the side thrust of the connecting rod. As the piston expands under rise of temperature, the clearance between the thrust faces and the cylinder wall is reduced because, the rate of expansion of the piston metal, usually aluminum, magnesium or the like, being greater than that of the iron or steel cylinder, the piston "grows" faster than the cylinder. As only the thrust faces are in contact with the cylinder wall and are cooled thereby, their expansion will tend to be less than that of the rest of the piston. Thus, expansion sets up distorting stresses in the piston. The cylinder is also subject to distorting stresses due to non-uniform cooling, since the cooling water does not have equal access to all parts of the cylinder. In some engines a quite appreciable distortion of the cylinder takes place.

With a piston of oval form working in a cylinder which may become distorted, it has been found that the parts of the piston which usually show signs of trouble are the lateral portions of the thrust faces adjacent the points where these faces join the wrist-pin bosses, or, generally, in the regions about 45° from the pin axis.

In accordance with this invention, control means are provided which are anchored at spaced points to the split thrust-face on both sides of the slot therein and anchored at the opposite thrust-face and more specifically at the middle of the opposite thrust-face. This control means is constructed to maintain a substantially constant relation between these 45° portions and the opposite thrust face. A control member 6, of steel or similar material strong in tension and having a coefficient of expansion not greatly different from that of the cylinder, is arranged within the piston body and anchored to the head ends of the thrust-face portions at three points, namely: at two points of one thrust face in the region about 45° from the pin axis, and at the middle of the opposite thrust face. The member 6 is of generally oval form or "loop shape," so as to extend around the interior of the piston, leaving the center open to accommodate the head of the connecting rod. This member may be punched from sheet steel of suitable gage. The end portions thereof are arcuate in form to match approximately the contour of the skirt. The side portions, where they pass the thrust portions 4, may be bowed inwardly so as not to cut those portions.

The member 6 may be placed in the mold when the piston is cast, the mold being formed to cast anchoring portions 7 and 8 of piston metal around the member 6, the portion 7 at the above-mentioned 45° points and the portion 8 at the middle of the opposite face, thus securing the member 6 at three points only of the piston body.

The thrust-face portions are separated from the head portion by horizontal slots 9, preferably located in the bottom of the last groove 5.

The thrust-face between the anchor points 7 may also be split by a vertical slot 10 extending from the slot 9 on that side to a point short of the end of the skirt.

The member 6 provides tension means anchored to the thrust-face portions at three points, forming a V with its apex at the point 8. These three points are, therefore, restrained against expansion, so as to maintain substantially a constant relation to the cylinder, and change of shape of the other parts of the thrust-faces takes place about these three points. At the same time the outward movement of the pin bosses under expansion is believed to cause the free portions of the split thrust-face to "pivot" at the points 7 and move inward as the bosses move outward. This tends to compensate for the difference in thermal expansion, so as to keep the thrust diameter of the piston in substantially constant relation to that of the cylinder. The arcuate portion of the member 6 between the points 7 may be narrowed slightly so as to be flexible enough to follow the movement of the thrust-face. The piston is also relatively flexible about the three anchorage points, and it has been found to work well in cylinders liable to distortion.

Having thus described the invention, what is claimed is:

1. A light-metal trunk piston of the character described, having a head, a skirt, wrist-pin bosses connected to said head, said skirt having a thrust-face portion separated from said head in the region between said bosses by a horizontal slot and split lengthwise by a slot extending downwardly from said first slot, and means less subject to thermal expansion than the piston metal anchored at spaced points to the split thrust-face on both sides of the slot therein and anchored at the middle of the opposite thrust-face.

2. A light-metal trunk piston of the character described, having a head, a skirt, wrist-pin bosses connected to said head, said skirt having opposite thrust-face portions separated from said head in the regions between said bosses by horizontal slots, one of said thrust-face portions being split lengthwise by a slot extending downwardly from the horizontal slot, and means less subject to thermal expansion than the piston metal anchored at spaced points to the split thrust-face on both sides of the slot therein and anchored at the middle of the opposite thrust-face.

3. A light-metal trunk piston of the character described, having a head, a skirt, wrist-pin bosses connected to said head, said skirt having a thrust-face portion separated from said head in the region between said bosses by a horizontal slot and split lengthwise by a slot extending downwardly from said first slot, and means less subject to thermal expansion than the piston metal, anchored at spaced points at the side corners of the split thrust-face and anchored at the opposite thrust-face.

4. A light-metal trunk piston of the character described, having a head, a skirt, wrist-pin bosses connected to said head, said skirt having opposite thrust-face portions separated from said head in the regions between said bosses by horizontal slots, one of said thrust-face portions being split lengthwise by a slot extending downwardly from the horizontal slot, and means less subject to thermal expansion than the piston metal, anchored at spaced points at the side corners of the split thrust-face and anchored at the opposite thrust-face.

5. A light-metal trunk piston of the character described, having a head, a skirt, wrist-pin bosses connected to said head, said skirt having a thrust-face portion separated from said head in the region between said bosses by a horizontal slot and split lengthwise by a slot extending downwardly from said first slot, and a loop-shaped control member having a coefficient of thermal expansion less than that of the piston metal positioned inside the piston and anchored to the lateral portions of said split thrust-face and the middle portion of the opposite thrust-face.

6. A light-metal trunk piston of the character described, having a head, a skirt, wrist-pin bosses connected to said head, said skirt having opposite thrust-face portions separated from said head in the regions between said bosses by horizontal slots, one of said thrust-face portion being split lengthwise by a slot extending downwardly from the horizontal slot, and a loop-shaped control member having a coefficient of thermal expansion less than that of the piston metal positioned inside the piston and anchored to the lateral portions of said split thrust-face and the middle portion of the opposite thrust face.

7. A light-metal trunk piston of the character described, having a head, a skirt, wrist-pin bosses connected to said head, said skirt having a thrust-face portion separated from said head in the region between said bosses by a horizontal slot and split lengthwise by a slot extending downwardly from said first slot, and means anchored at spaced points to the split face on both sides of the slot therein and anchored at the opposite thrust face and operating to resist thermal expansion of the lateral portions of said thrust-face whereby expansion of the piston along the wrist-pin axis will cause the split portion of said thrust-face to move radially inwardly upon rise of temperature.

8. A light-metal trunk piston of the character described, having a head, a skirt, wrist-pin bosses connected to said head, said skirt having a thrust-face portion separated from said head in the region between said bosses by a horizontal slot and split lengthwise by a slot extending downwardly from said first slot, and a loop-shaped control member of relatively low thermal expansion anchored at spaced points to the split face on both sides of the slot therein and anchored at the opposite thrust face and operating to resist thermal expansion of the lateral portions of said thrust-face whereby expansion of the piston along the wrist-pin axis will cause the split portion of said thrust-face to move radially inwardly upon rise of temperature.

9. A light-metal trunk piston of the character described, having a head, a skirt, wrist-pin bosses connected to said head, said skirt having a thrust-face portion separated from said head in the region between said bosses by a horizontal slot and split lengthwise by a slot extending downwardly from said first slot, and a loop-shaped control member of a relatively low thermal expansion anchored at spaced points to the split face on both sides of the slot therein and anchored at the opposite thrust face and operating to resist thermal expansion of the lateral portions of said thrust-face whereby expansion of the piston along the wrist-pin axis will cause the split portion of said thrust-face to move radially inwardly upon rise of temperature, said control member having a portion positioned within said thrust-face portion which also moves inwardly under stresses imposed by expansion of the piston.

10. A light-metal trunk piston of the character described, having a head, a skirt, wrist-pin bosses connected to said head, said skirt having opposite thrust-face portions separated from said head in the regions between said bosses by horizontal slots, one of said thrust-face portions being split lengthwise by a slot extending downwardly from the horizontal slot, and means anchored at spaced points to the split face on both sides of the slot therein and anchored at the opposite thrust face and operating to resist thermal expansion of the lateral portions of said thrust-face whereby expansion of the piston along the wrist-pin axis will cause the split portion of said thrust-face to move radially inwardly upon rise of temperature.

11. A light-metal trunk piston of the character described, having a head, a skirt, wrist-pin bosses connected with said head, said skirt having opposite thrust-face portions separated from said head in the regions between said bosses by horizontal slots, and a loop-shaped control member having a coefficient of thermal expansion less than that of the piston metal positioned inside the piston and anchored to the lateral portions only of one of said thrust-faces and the middle portion of the opposite thrust-face.

WILLIAM M. VENNER.
PERCY L. BOWSER, JR.

REFERENCES CITED

The following references are of record in the file of this patent:

UNITED STATES PATENTS

| Number | Name | Date |
| --- | --- | --- |
| 1,891,419 | Jardine | Dec. 20, 1932 |
| 2,083,533 | Long | June 8, 1937 |
| 2,262,132 | Berry | Nov. 11, 1941 |
| 2,426,732 | Gates | Sept. 2, 1947 |